US012761082B2

(12) United States Patent
Lin et al.

(10) Patent No.: US 12,761,082 B2
(45) Date of Patent: Oct. 13, 2026

(54) OPTICAL POLARIZATION DIVERSITY RECEIVER

(71) Applicant: Lightel Technologies, Inc., Renton, WA (US)

(72) Inventors: Shyh-Chung Lin, Renton, WA (US); Hongyu Hu, Renton, WA (US); Yong Mao, Renton, WA (US)

(73) Assignee: Lightel Technologies, Inc., Renton, WA (US)

( * ) Notice: Subject to any disclaimer, the term of this patent is extended or adjusted under 35 U.S.C. 154(b) by 113 days.

(21) Appl. No.: 18/540,928

(22) Filed: Dec. 15, 2023

(65) Prior Publication Data

US 2025/0198850 A1 Jun. 19, 2025

(51) Int. Cl.
*G01J 9/02* (2006.01)
*G02B 5/30* (2006.01)

(52) U.S. Cl.
CPC ......... *G01J 9/02* (2013.01); *G01J 2009/0211* (2013.01); *G01J 2009/0226* (2013.01); *G01J 2009/0261* (2013.01); *G01J 2009/0288* (2013.01); *G02B 5/3025* (2013.01)

(58) Field of Classification Search
None
See application file for complete search history.

(56) References Cited

U.S. PATENT DOCUMENTS

2012/0224184 A1* 9/2012 Li .......................... H04B 10/60 356/491
2017/0322406 A1* 11/2017 Sirat .................. G01N 21/6458
2017/0336326 A1* 11/2017 Sirat .................. G02B 21/0076
2021/0262921 A1* 8/2021 Boosalis .............. G01N 21/211
2023/0124259 A1* 4/2023 Mehta ................ G01N 21/6458 356/364
2023/0188215 A1* 6/2023 Lin ......................... G01S 7/499
2024/0283531 A1* 8/2024 He ..................... H04B 10/0731

* cited by examiner

*Primary Examiner* — Kara E. Geisel
*Assistant Examiner* — Chad Andrew Reverman
(74) *Attorney, Agent, or Firm* — J. H. Lin Patent Law P.C.

(57) ABSTRACT

A tri-mask optical polarization diversity receiver with a single input terminal and three output terminals prevents polarization induced signal fade, and may be used in an optical interferometry system for coherent detection. The device is composed of optical collimators, non-polarizing beam splitters, linear polarizers and photodetectors. In addition, the structural design incorporates two mechanically identical modulets, as well as a beam displacement compensation mechanism for ease of alignment and assembly. Compared to fiber-based design, the free-space configuration gets rid of inevitable birefringence in fused fiber couplers which detrimentally alter the polarization state received by the polarizers. As a result, it facilitates effective and precise measurements of optical interference with optimized visibility.

15 Claims, 7 Drawing Sheets

OPTICAL POLARIZATION DIVERSITY RECEIVER

BACKGROUND

Technical Field

The present invention generally relates to optical sensors, and more specifically, to an optical polarization diversity receiver used in a fiber-optic interferometer for coherent detection.

Background of the Invention

In fiber-optic sensors, optical fibers serve as the sensing elements to monitor environmental physical quantities such as temperature, velocity and pressure as they alter the properties of fibers, thereby affecting the light traveling through them. For example, a common configuration for optical sensing is the Mach-Zehnder interferometer which consists of a sensing arm and a reference arm. As the sensing arm is exposed to and interacts with the environment, the interference signal generated by the mixed optical beams from both arms can be sent to a receiver for demodulation to obtain the desired measurement.

A challenge of such two-beam interferometry is signal fade due to polarization mismatch. Interference occurs perfectly for collinear polarizations with maximized visibility. Conversely, if the polarization directions of the two beams are orthogonal to each other, interference is negated and the visibility drops to zero. A demodulator is required to have a high visibility in order to operate correctly. However, in practice, the polarization state of the beam in each interferometer arm is usually unpredictable, and consequently, there's a possibility that the interferometer enters a faded state, rendering visibility too low to make a measurement.

To combat polarization sensitivity, an approach known as polarization diversity can be employed, where the interference signal is divided and projected across multiple polarization axes, and the strongest output is selected for further processing. Theoretically, a tri-mask or tri-cell polarization diversity receiver (PDR) equipped with three polarizers set 60 degrees apart from each other has been proved to effectively limit the minimum normalized visibility to around 40%. While signal fades are still possible with two polarizers, using more than three polarizers reduces signal fade at the price of increased complexity. With different input polarization states, the maximum interference signal will change from one polarizer output to another, and the demodulator must automatically track the best interference signal for demodulation.

A critical requirement for the PDR to work as desired is that the polarization state received by all the polarizers should be the same. Traditionally, a 1×3 fused fiber-optic coupler is used to distribute an input signal into three outputs. But owing to factors like manufacturing imperfections and mechanical stress that disrupt circular symmetry, optical fibers always exhibit certain degree of birefringence in practice, which leads to an uncontrolled shift in the output polarization state. As a consequence, the three beams directed from the coupler to the corresponding polarizers have different polarization, compromising the accuracy of measurements. Therefore, it is an objective of the present invention to provide an optical PDR without the influence of birefringence.

SUMMARY

A tri-mask optical polarization diversity receiver with an input port and three output ports is constructed with non-polarizing beam splitters and linear polarizers. In addition, optical collimators and photodetectors are used at the four terminals to interface with optical signals.

In one aspect, the configuration of the optical elements is arranged such that an incoming two-beam interference signal is collimated and split into three beams with equal power. Each of these beams travels towards a linear polarizer allowing the transmission of a specific polarization axis, wherein the interference projected along that axis exits at the corresponding output.

In the second aspect, the risk of beam propagation through materials with potential birefringence effects is mitigated in the design, so the beam's polarization remains unchanged until interacting with the linear polarizers. Therefore, each polarizer accurately processes the same state of polarization.

In the third aspect, the polarization diversity receiver contains two mechanically identical modulets formed by a non-polarizing beam splitter, a linear polarizer and a photodetector or optical collimator. Each modulet can be made independently and integrated into the overall assembly thereafter, thus the manufacturing is streamlined.

In the fourth aspect, the configuration of the components is arranged such that beam displacement caused by refraction in one beam splitter is compensated by the other beam splitter.

In one embodiment, the polarization diversity receiver device includes a photodetector at each output port to convert optical signals into electrical signals.

In the other embodiment, the polarization diversity receiver device includes an optical collimator with a fiber pigtail at each output port, which sends the optical signal to an external photodetector properly located at a suitable remote position.

Various embodiments are disclosed below, with reference to the attached figures to provide better understanding of the principles and benefits of present invention.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration.

Various proposed designs, schemes and embodiments in accordance with the present disclosure of a compact optical polarization diversity receiver, which generates separate interference signals across some distinct polarization axes, are described in detail below. This is achieved via a free-space beam propagation design to avoid birefringence in optical waveguides and ensure that the state of polarization arriving at all the polarizers is identical.

The following provides a description of the working principle of the designed optical tri-mask polarization diversity receiver, which has an input port and three output ports. Initially, an optical dual-beam interference signal is collimated by an optical collimator at the input port, which propagates within non-birefringent media and is partitioned into three distinct beams by non-polarizing beam splitters. Each beam keeps the same polarization state and is redirected towards its respective linear polarizer, where the interference signal across the polarization transmission axis is extracted and then coupled into either a photodetector or an optical fiber. The three polarizers are strategically set with their axes 60 degrees apart, allowing for the selection of the most substantial output for post-processing.

Figure 1:
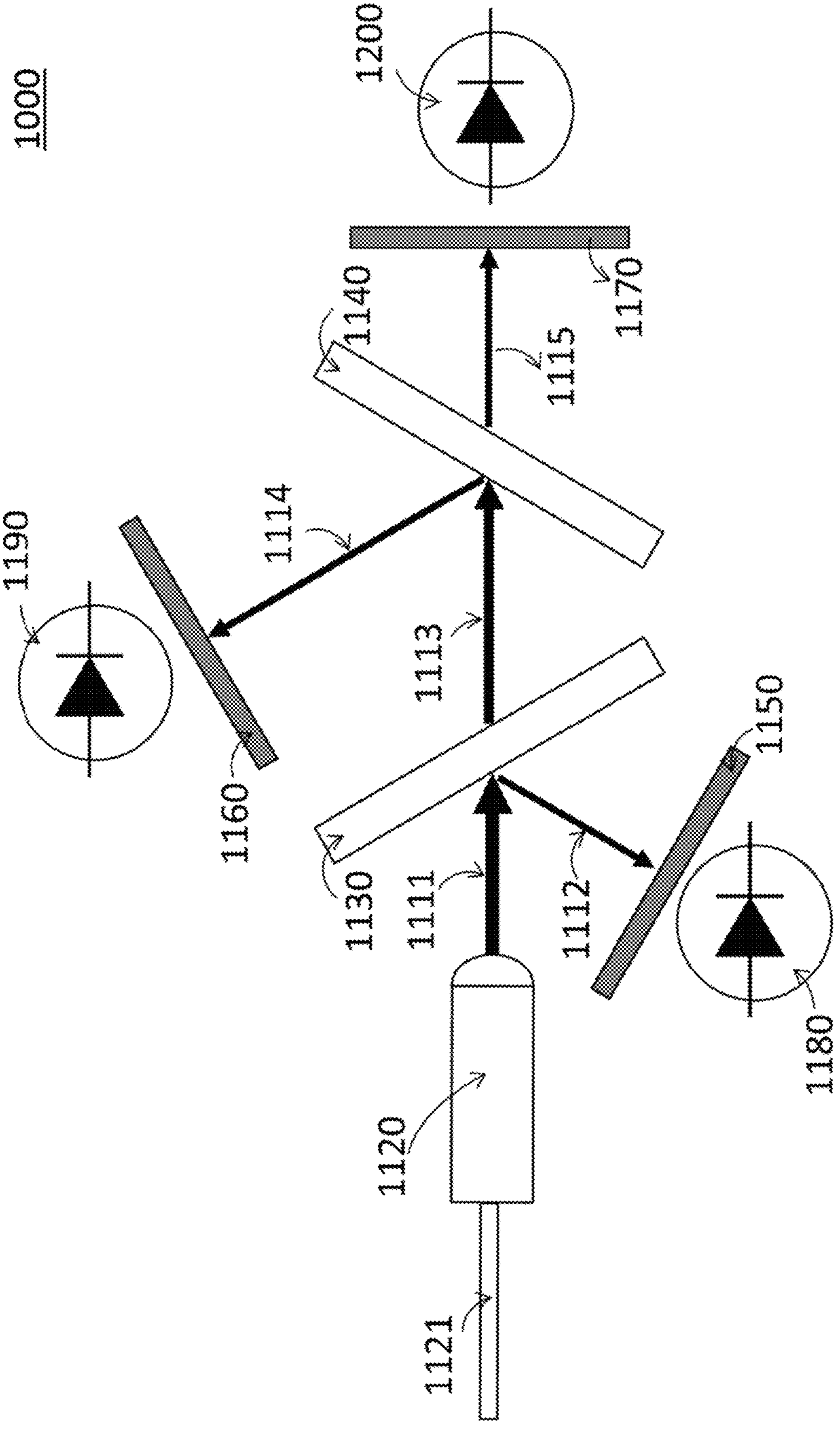
FIG. 1 is a diagram showing the structure of an optical polarization diversity receiver assembly and the associated beam propagation, in accordance with one embodiment of the present disclosure.

One embodiment of the optical polarization diversity receiver is depicted in FIG. 1. The assembly 1000 comprises an optical collimator 1120 having an optical fiber pigtail 1121, a first non-polarizing beam splitter 1130, a second non-polarizing beam splitter 1140, a first linear polarizer 1150, a second linear polarizer 1160, a third linear polarizer 1170, a first photodetector 1180, a second photodetector 1190, and a third photodetector 1200.

The optical collimator 1120 comprises a lens to collimate an input divergent light beam emerging from the fiber pigtail 1121. Typically, the fiber 1121 is secured inside a ferrule. Examples of lenses include convex lens and gradient-index lens.

Each of the first non-polarizing beam splitter 1130 and the second non-polarizing beam splitter 1140 incorporates a coating layer to split an incident light beam into two spatially separate beams at a designated ratio irrespective of the polarization state. A specific portion of the incoming light power is reflected by the coating while the remainder transmits through it. For example, a tap thin-film filter is a plate of substrate with partially reflecting coating on one surface facing towards the incident beam. Alternatively, a cube beam splitter can be employed, which is constructed by cementing two prisms together where the coating is at the internal interface. Ideally, to divide the input power evenly so the three outputs each obtains ⅓ of the total power, the reflection ratio of the first beam splitter 1130 should be ⅓, and the second beam splitter 1140 should have a reflection ratio of ½. The coating layers of 1130 and 1140 need to be orientated properly to align the reflected beams with the respective output photodetectors 1180 and 1190.

Figure 7:
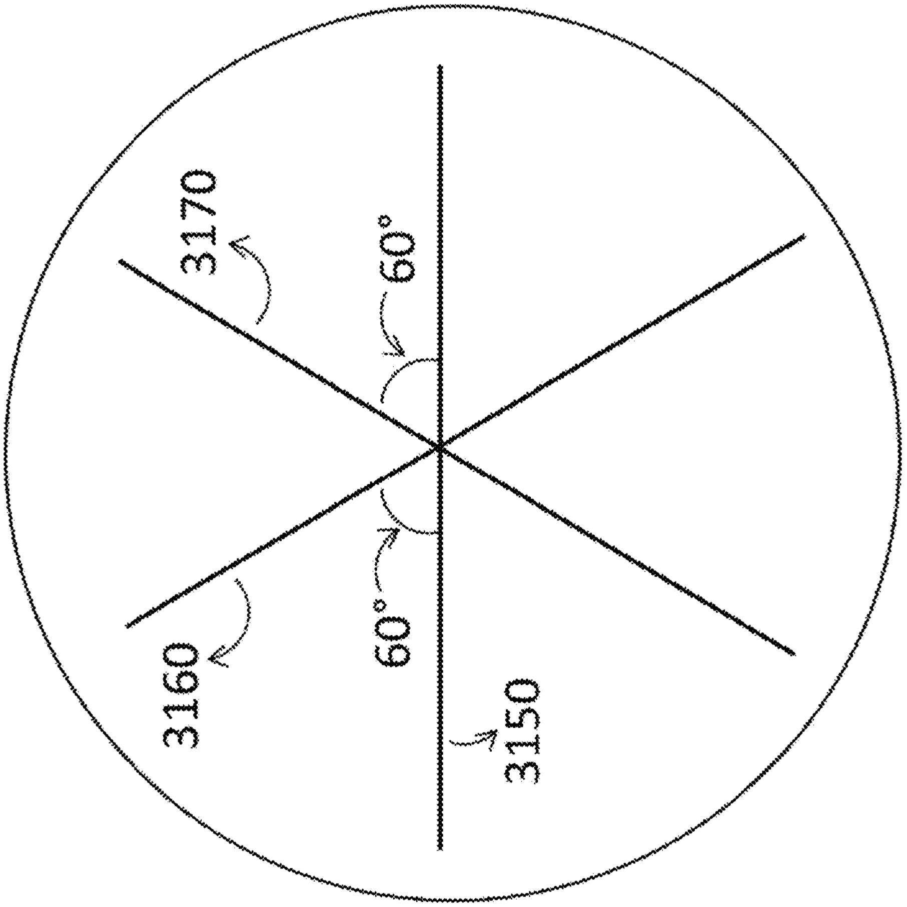
FIG. 7 is a diagram showing the orientation of the transmission axes of the three polarizers of the present disclosure.

The first linear polarizer 1150, the second linear polarizer 1160 and the third linear polarizer 1170 positioned perpendicularly to the optical axis only allow a specific linear polarization component of light waves to traverse while the orthogonal component is blocked by absorption or reflection. Various types of linear polarizers can be used including, but not limited to, birefringent crystals, dichroic filters, Brewster polarizers and wire grid polarizers. When two beams are coherently combined and pass through the linear polarizer, the output is essentially the interference projected along the polarizer's transmission axis. FIG. 7 illustrates the orientations (in any sequence) of the three polarizers, with the polarization axes 3150, 3160 and 3170 separated equally by 60 degrees.

The first photodetector 1180, the second photodetector 1190 and the third photodetector 1200 function as the output receivers that convert optical signals into electrical signals. The intensity of the received beam is monitored by each photodetector for subsequent evaluation.

Figure 2:
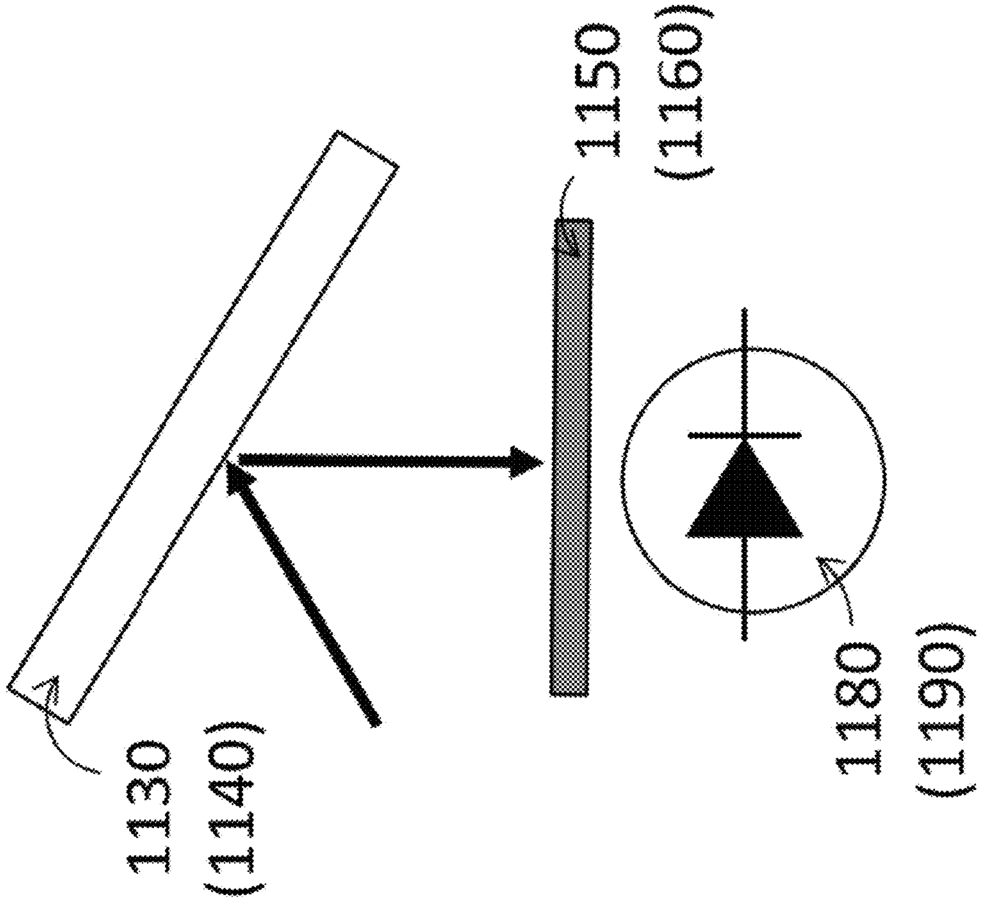
FIG. 2 is a diagram showing the components comprising a modulet in the design, in accordance with one embodiment of the present disclosure.

A feature of the design of polarization diversity receiver assembly 1000 is that it is constructed with two mechanically identical modulets consisting of a non-polarizing beam splitter, a linear polarizer and a photodetector. FIG. 2 illustrates the components comprising a modulet within assembly 1000. One of the modulets includes 1130, 1150 and 1180, while the other modulet contains 1140, 1160 and 1190. The structure of the modulets is the same except the split ratio of the beam splitter. During the assembling process, each modulet can be individually fabricated and subsequently integrated into the overall assembly 1000. Therefore, the design provides simplified mechanical structure for ease of manufacturing.

Referring to FIG. 1, an input two-beam interference signal enters the fiber pigtail 1121 and is collimated to a light beam 1111 via the optical collimator 1120. This collimated beam 1111 is then split into two paths, i.e., 1112 and 1113, by the first non-polarizing beam splitter 1130. The reflected beam 1112 contains ⅓ of the initial power while retaining the original state of polarization, and subsequently passes through the first linear polarizer 1150 towards the first photodetector 1180. Meanwhile, the transmitted beam 1113 holds ⅔ of the input power which gets further divided by the second non-polarizing beam splitter 1140, with 50% split ratio, into two beams 1114 and 1115. Therefore, same as beam 1112, the reflected beam 1114 and the transmitted beam 1115 each possesses ⅓ of the input power as well as consistent polarization. Ultimately, beam 1114 illuminates the second linear polarizer 1160 and is received by the second photodetector 1190, while beam 1115 is incident on the third linear polarizer 1170 and captured by the third photodetector 1200.

In the design described above, the light beams predominantly travel in free space rather than being guided through dielectric waveguides or other media such as optical fibers. Additionally, the optical collimator 1120, the first beam splitter 1130 and the second beam splitter 1140 can be fabricated from isotropic and polarization-independent materials with optimized compactness to limit internal optical path length. Therefore, the input optical signal undergoes minimal birefringence effects, and the polarization state of the beams received by the polarizers 1150, 1160 and 1170 are identical to that of the input. Furthermore, for the input signal which is a coherent combination of two beams, with the configuration shown in FIG. 7, it is ensured that at least one of the three polarizer axes acquires non-zero projections from both of the original interfered beams. Consequently, by continuously selecting the largest output, such tri-mask polarization diversity setup prohibits signal fade, enhancing visibility while preserving structural simplicity and compactness.

Figure 3:
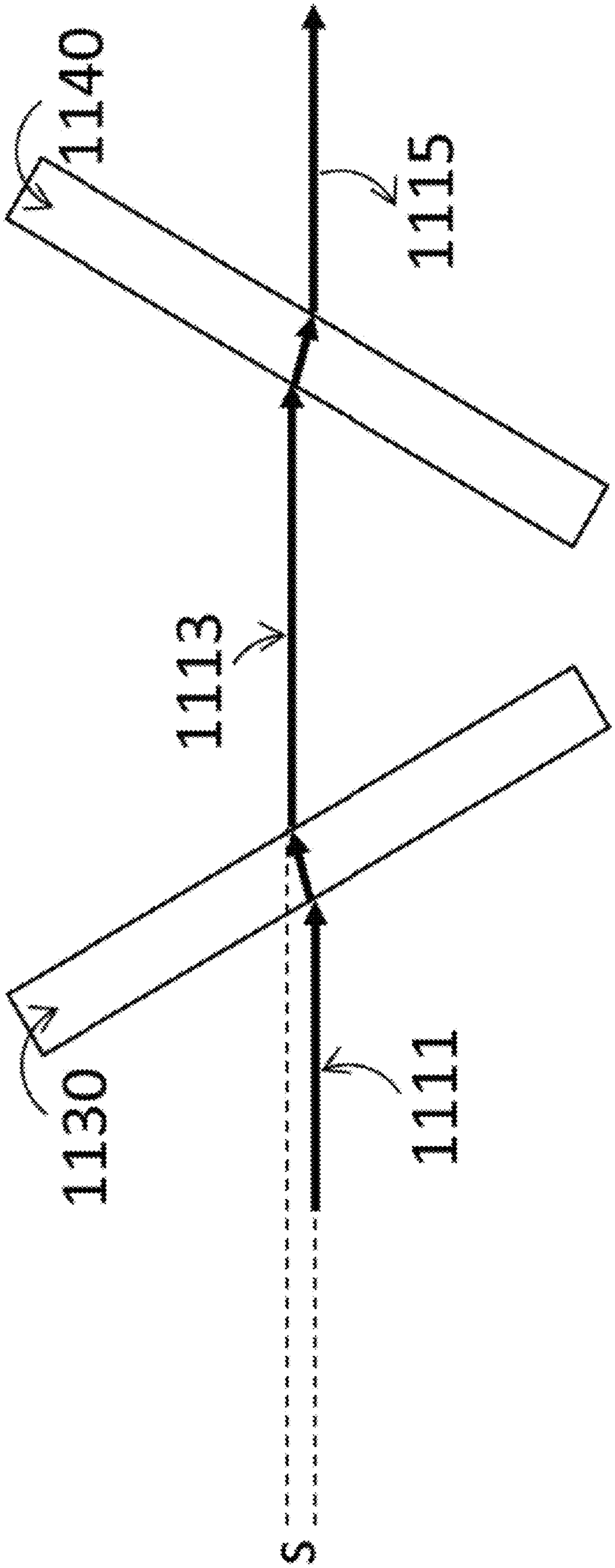
FIG. 3 is a diagram showing the compensation of beam displacement in the design, in accordance with one embodiment of the present disclosure.

Note that the design described above also benefits from compensation of beam displacement. As shown in FIG. 3, due to refraction, when light passes through the first non-polarizing beam splitter 1130, it's possible that the output beam 1113 is displaced by a certain distance s from the input beam 1111. The beam displacement s depends on the angle of incidence as well as the thickness and refractive index of the beam splitter. However, since the two modulets in the assembly 1000 are mechanically identical, the displacement induced in the first beam splitter 1130 is compensated by the displacement created in the second beam splitter 1140. As a result, after integrating the two modulets into the assembly, no displacement is introduced between the last beam 1115 and the input beam 1111, which facilitates easier optical alignment.

Figure 4:
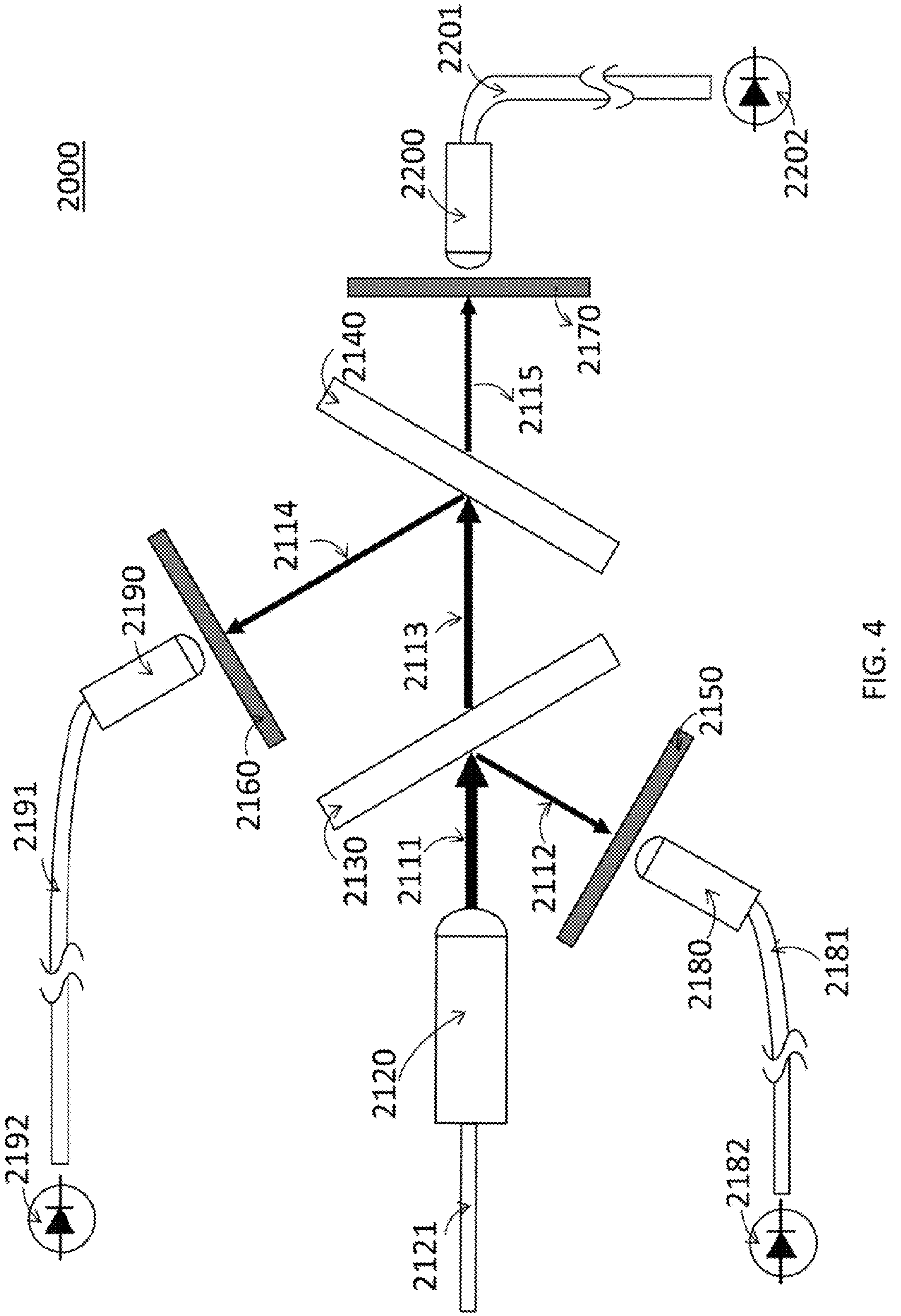
FIG. 4 is a diagram showing the structure of an optical polarization diversity receiver assembly and the associated beam propagation, in accordance with the other embodiment of the present disclosure.

A second embodiment of the optical polarization diversity receiver is depicted in FIG. 4. The assembly 2000 comprises a first optical collimator 2120 having a first optical fiber pigtail 2121, a second optical collimator 2180 having a second optical fiber pigtail 2181, a third optical collimator 2190 having a third optical fiber pigtail 2191, a fourth optical collimator 2200 having a fourth optical fiber pigtail 2201, a first non-polarizing beam splitter 2130, a second non-polarizing beam splitter 2140, a first linear polarizer 2150, a second linear polarizer 2160, and a third linear polarizer 2170.

The first optical collimator 2120 comprises a lens to collimate an input divergent light beam emerging from the first fiber pigtail 2121. The second optical collimator 2180, the third optical collimator 2190 and the fourth optical collimator 2200 have similar construction to couple collimated light beams into the second fiber 2181, the third fiber 2191 and the fourth fiber 2201 respectively. Typically, the fibers 2121, 2181, 2191 and 2201 are secured inside ferrules. Examples of lenses include convex lens and gradient-index lens.

Each of the first non-polarizing beam splitter 2130 and the second non-polarizing beam splitter 2140 incorporates a coating layer to split an incident light beam into two spatially separate beams at a designated ratio irrespective of the polarization state. A specific portion of the incoming light power is reflected by the coating while the remainder transmits through it. For example, a tap thin-film filter is a plate of substrate with partially reflecting coating on one surface facing towards the incident beam. Alternatively, a cube beam splitter can be employed, which is constructed by cementing two prisms together where the coating is at the internal interface. Ideally, to divide the input power evenly so the three outputs each obtains ⅓ of the total power, the reflection ratio of the first beam splitter 2130 should be ⅓, and the second beam splitter 2140 should have a reflection ratio of ½. The coating layers of 2130 and 2140 need to be orientated properly to align the reflected beams with the respective output collimators 2180 and 2190.

The first linear polarizer 2150, the second linear polarizer 2160 and the third linear polarizer 2170 positioned perpendicularly to the optical axis only allow a specific linear polarization component of light waves to traverse while the orthogonal component is blocked by absorption or reflection. Various types of linear polarizers can be used including, but not limited to, birefringent crystals, dichroic filters, Brewster polarizers and wire grid polarizers. When two beams are coherently combined and pass through the linear polarizer, the output is essentially the interference projected along the polarizer's transmission axis. FIG. 7 illustrates the orientations (in any sequence) of the three polarizers, with the polarization axes 3150, 3160 and 3170 separated equally by 60 degrees.

The first external photodetector 2182, the second external photodetector 2192 and the third external photodetector 2202 are positioned in any remote locations that are deemed suitable (e.g., within a low-noise environment), and used to collect light signals transmitted by the second optical fiber 2181, the third optical fiber 2191 and the fourth optical fiber 2201 respectively. They function as the output receivers that convert optical signals into electrical signals. The intensity of the received beam is monitored by each external photodetector for subsequent evaluation.

Figure 5:
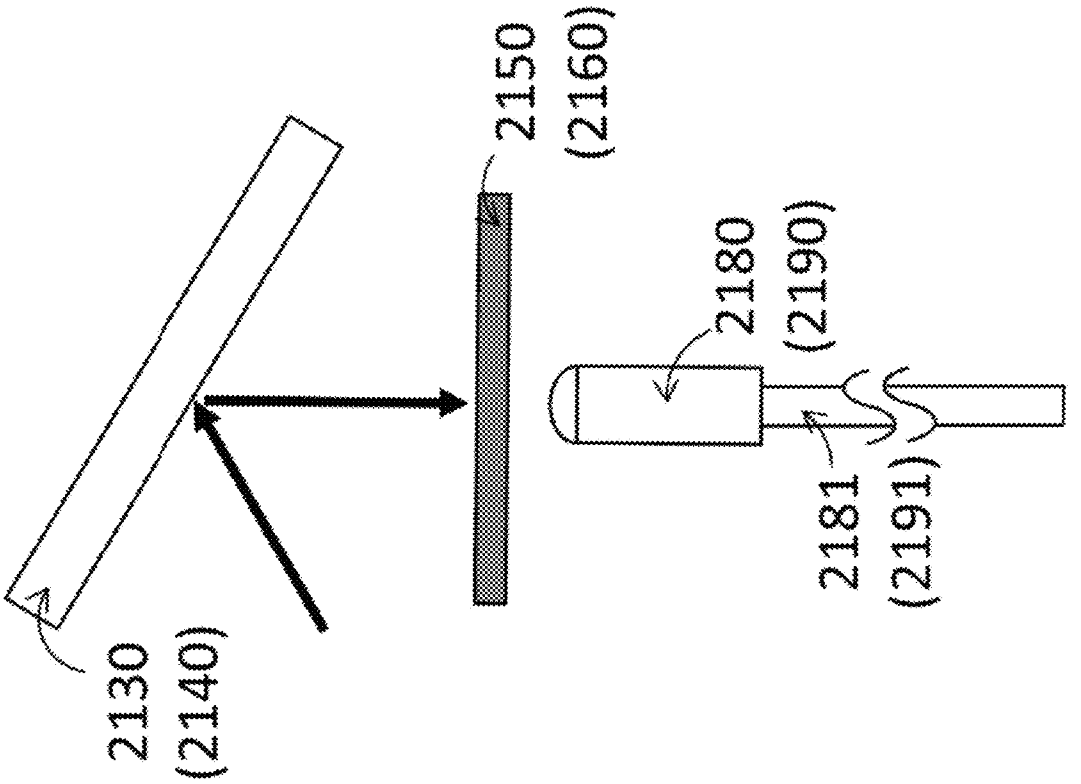
FIG. 5 is a diagram showing the components comprising a modulet in the design, in accordance with the other embodiment of the present disclosure.

A feature of the design of polarization diversity receiver assembly 2000 is that it is constructed with two mechanically identical modulets consisting of a non-polarizing beam splitter, a linear polarizer and an optical collimator. FIG. 5 illustrates the components comprising a modulet within assembly 2000. One of the modulets includes 2130, 2150 and 2180, while the other modulet contains 2140, 2160 and 2190. The structure of the modulets is the same except the split ratio of the beam splitter. During the assembling process, each modulet can be individually fabricated and subsequently integrated into the overall assembly 2000. Therefore, the design provides simplified mechanical structure for ease of manufacturing.

Referring to FIG. 4, an input two-beam interference signal enters the first fiber pigtail 2121 and is collimated to a light beam 2111 via the first optical collimator 2120. This collimated beam 2111 is then split into two paths, i.e., 2112 and 2113, by the first non-polarizing beam splitter 2130. The reflected beam 2112 contains ⅓ of the initial power while retaining the original state of polarization, and subsequently passes through the first linear polarizer 2150 towards the second optical collimator 2180 and the first external photodetector 2182. Meanwhile, the transmitted beam 2113 holds ⅔ of the input power which gets further divided by the second non-polarizing beam splitter 2140, with 50% split ratio, into two beams 2114 and 2115. Therefore, same as beam 2112, the reflected beam 2114 and the transmitted beam 2115 each possesses ⅓ of the input power as well as consistent polarization. Ultimately, beam 2114 illuminates the second linear polarizer 2160 and is received by the third optical collimator 2190 and the second external photodetector 2192, while beam 2115 is incident on the third linear polarizer 2170 and captured by the fourth optical collimator 2200 and the third external photodetector 2202.

In the design described above, the light beams predominantly travel in free space rather than being guided through dielectric waveguides or other media such as optical fibers. Additionally, the first optical collimator 2120, the first beam splitter 2130 and the second beam splitter 2140 can be fabricated from isotropic and polarization-independent materials with optimized compactness to limit internal optical path length. Therefore, the input optical signal undergoes minimal birefringence effects, and the polarization state of the beams received by the polarizers 2150, 2160 and 2170 are identical to that of the input. Furthermore, for the input signal which is a coherent combination of two beams, with the configuration shown in FIG. 7, it is ensured that at least one of the three polarizer axes acquires non-zero projections from both of the original interfered beams. It should be noted that after the linear polarizer, it is only the intensity variation of the light that is of concern, so any polarization alteration in the fibers 2181, 2191 and 2201 has no impact on the application. Consequently, by continuously selecting the largest output, such tri-mask polarization diversity setup prohibits signal fade, enhancing visibility while preserving structural simplicity and compactness.

Figure 6:
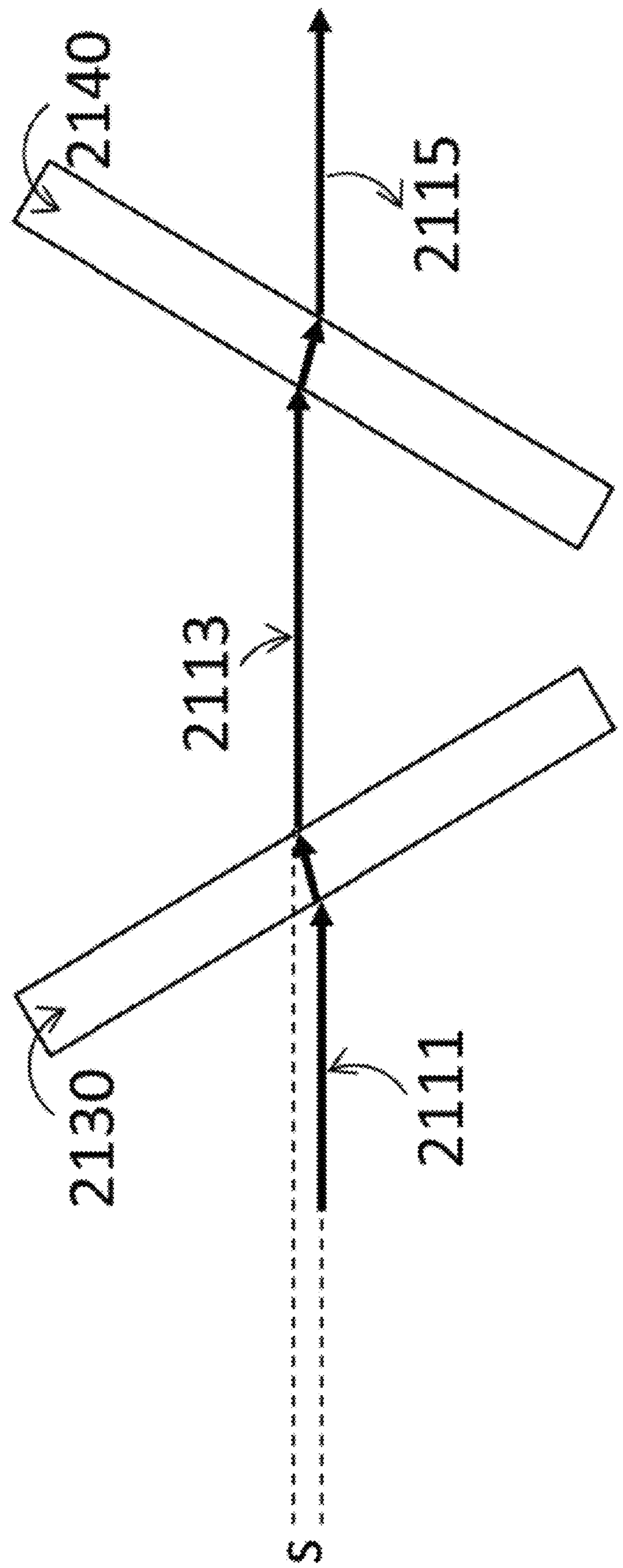
FIG. 6 is a diagram showing the compensation of beam displacement in the design, in accordance with the other embodiment of the present disclosure.

Note that the design described above also benefits from compensation of beam displacement. As shown in FIG. 6, due to refraction, when light passes through the first non-polarizing beam splitter 2130, it's possible that the output beam 2113 is displaced by a certain distance s from the input beam 2111. The beam displacement s depends on the angle of incidence as well as the thickness and refractive index of the beam splitter. However, since the two modulets in the assembly 2000 are mechanically identical, the displacement induced in the first beam splitter 2130 is compensated by the displacement created in the second beam splitter 2140. As a result, after integrating the two modulets into the assembly, no displacement is introduced between the last beam 2115 and the input beam 2111, which facilitates easier optical alignment.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. An optical polarization diversity receiver assembly, comprising:
- an optical collimator;
- a first non-polarizing beam splitter;
- a second non-polarizing beam splitter;
- a first linear polarizer;
- a first photodetector;
- a second linear polarizer;
- a second photodetector;
- a third linear polarizer; and
- a third photodetector, wherein, during operation:
- with an input of an optical dual-beam interference signal launched into the optical collimator, a collimated beam emerges and propagates in a free space,
- the collimated beam is divided by the first non-polarizing beam splitter followed by the second non-polarizing beam splitter into exactly three beams of equal power, each beam containing ⅓ of an input power of the collimated beam, the first non-polarizing beam splitter splits the collimated beam by reflecting a first beam toward the first linear polarizer and transmitting through an intermediate beam toward the second non-polarizing beam splitter, the second non-polarizing beam splitter splits the intermediate beam by reflecting a second beam toward the second linear polarizer and transmitting through a third beam toward the third linear polarizer,
- permissible polarization transmission axes of the first linear polarizer, the second linear polarizer and the third linear polarizer are set apart from each other by a predetermined angle of 60 degrees, with a respective transmitted beam manifesting interference across each corresponding axis,
- three separate beams generated from the first linear polarizer, the second linear polarizer and the third linear polarizer are coupled correspondingly into the first photodetector, the second photodetector and the third photodetector to be converted into electrical signals, and a maximum electrical signal among the electrical signals is selected for analysis, and
- each of the three separate beams in the optical polarization diversity receiver assembly maintains a same polarization state as that of the input when entering the respective linear polarizer by propagating through the free space or a polarization-independent media.

2. The optical polarization diversity receiver assembly of claim 1, wherein the optical collimator comprises a convex lens.

3. The optical polarization diversity receiver assembly of claim 1, wherein the optical collimator comprises a gradient-index lens.

4. The optical polarization diversity receiver assembly of claim 1, wherein each of the first non-polarizing beam splitter and the second non-polarizing beam splitter comprises a plate beam splitter.

5. The optical polarization diversity receiver assembly of claim 1, wherein each of the first non-polarizing beam splitter and the second non-polarizing beam splitter comprises a cube beam splitter.

6. The optical polarization diversity receiver assembly of claim 1, wherein each of the first linear polarizer, the second linear polarizer and the third linear polarizer comprises a birefringent crystal.

7. The optical polarization diversity receiver assembly of claim 1, wherein each of the first linear polarizer, the second linear polarizer and the third linear polarizer comprises a dichroic filter.

8. The optical polarization diversity receiver assembly of claim 1, wherein each of the first linear polarizer, the second linear polarizer and the third linear polarizer comprises a Brewster polarizer.

9. The optical polarization diversity receiver assembly of claim 1, wherein each of the first linear polarizer, the second linear polarizer and the third linear polarizer comprises a wire grid polarizer.

10. The optical polarization diversity receiver assembly of claim 1, wherein two mechanically identical modulets are incorporated.

11. An optical polarization diversity receiver assembly, comprising:
- a first optical collimator;
- a first non-polarizing beam splitter;
- a second non-polarizing beam splitter;
- a first linear polarizer;
- a second optical collimator;
- a second linear polarizer;
- a third optical collimator;
- a third linear polarizer; and
- a fourth optical collimator;

wherein, during operations:

with an input of an optical dual-beam interference signal launched into the first optical collimator, a collimated beam emerges and propagates in a free space, the collimated beam is divided by the first non-polarizing beam splitter followed by the second non-polarizing beam splitter into exactly three beams of equal power, each beam containing ⅓ of an input power of the collimated beam, the first non-polarizing beam splitter splits the collimated beam by reflecting a first beam toward the first linear polarizer and transmitting through an intermediate beam toward the second non-polarizing beam splitter, the second non-polarizing beam splitter splits the intermediate beam by reflecting a second beam toward the second linear polarizer and transmitting through a third beam toward the third linear polarizer, permissible polarization transmission axes of the first linear polarizer, the second linear polarizer and the third linear polarizer are set apart from each other by a predetermined angle of 60 degrees, with a respective transmitted beam manifesting interference across each corresponding axis, three separate beams generated from the first linear polarizer, the second linear polarizer and the third linear polarizer are coupled correspondingly into the second optical collimator, the third optical collimator and the fourth optical collimator, the second optical collimator, the third optical collimator and the fourth optical collimator send optical signals through optical fibers correspondingly to a first external photodetector, a second external photodetector and a third external photodetector located remotely, to convert optical signals into electrical signals with a maximum electrical signal among the electrical signals selected for analysis, and each of the three separate beams in the assembly maintains a same polarization state as that of the input when entering the respective linear polarizer by propagating through the free space or a polarization-independent media.

12. The optical polarization diversity receiver assembly of claim 11, wherein each of the second optical collimator, the third optical collimator and the fourth optical collimator comprises a convex lens.

13. The optical polarization diversity receiver assembly of claim 11, wherein each of the second optical collimator, the third optical collimator and the fourth optical collimator comprises a gradient-index lens.

14. The optical polarization diversity receiver assembly of claim 1, where the directions of the first linear polarizer, the second linear polarizer, and the third linear polarizer are set normally 60 degrees apart relative to each other.

15. The optical polarization diversity receiver assembly of claim 11, where the directions of the first linear polarizer, the second linear polarizer, and the third linear polarizer are set normally 60 degrees apart relative to each other.

* * * * *